United States Patent [19]

Engel et al.

[11] 4,342,226
[45] Aug. 3, 1982

[54] TURN INDICATOR FOR SHIPS OR AIRCRAFT

[75] Inventors: Rudolf Engel, St. Goar; Horst P. Meier, Oberwesel, both of Fed. Rep. of Germany

[73] Assignee: Engel & Meier oHG, St. Goar, Fed. Rep. of Germany

[21] Appl. No.: 132,906

[22] Filed: Mar. 24, 1980

[30] Foreign Application Priority Data

Nov. 16, 1979 [DE] Fed. Rep. of Germany ....... 2946308

[51] Int. Cl.³ .............................................. G01P 9/02
[52] U.S. Cl. .................................... 73/504; 74/5.6 D; 74/5.9
[58] Field of Search ................ 73/504, 178 R; 74/5.9, 74/5.6 R, 5.6 D

[56] References Cited

U.S. PATENT DOCUMENTS

| | | | |
|---|---|---|---|
| 2,479,122 | 8/1949 | Konet | 74/5.6 D |
| 2,567,682 | 9/1951 | Silberstein | 74/5.6 D |
| 2,703,935 | 3/1955 | Mead et al. | 74/5.6 D |
| 2,746,301 | 5/1956 | Henderson | 74/5.6 D |
| 2,964,952 | 12/1960 | Hoover et al. | 74/5.6 D |

*Primary Examiner*—Donald O. Woodiel
*Attorney, Agent, or Firm*—Max Fogiel

[57] ABSTRACT

A turning indicator for indicating the turning direction and the turning speed of course changes of a ship or an aircraft, in which an electromotor is movably mounted between two supports of a carrier. An axle of the carrier is fixedly connected with the upper end of a leaf spring, the lower end of which is loosely guided. A measuring bridge is mounted on the leaf spring which is connected to an indicating device via an amplifier circuit. The measuring bridge can be supplied with direct current and the starting signal of the measuring bridge is also in the form of direct current which is positive or negative depending on the direction of deflection of the leaf spring, and thus indicates a measure of the turning direction, whereas the magnitude of the deflection of the leaf spring is a measure of the intensity of the starting signal and thus a measure of the turning speed.

10 Claims, 8 Drawing Figures

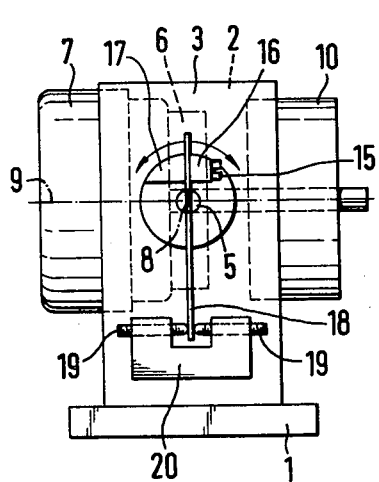
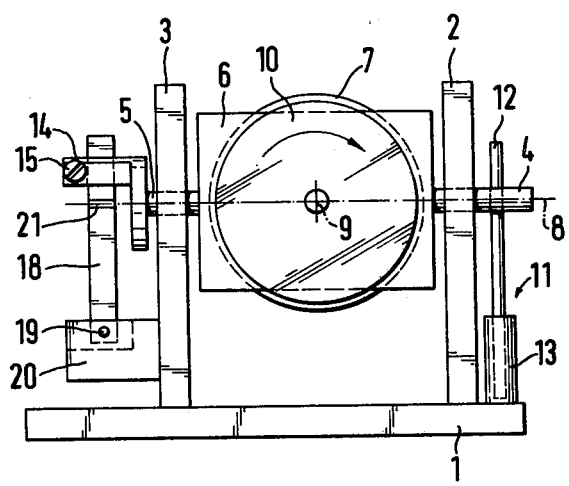
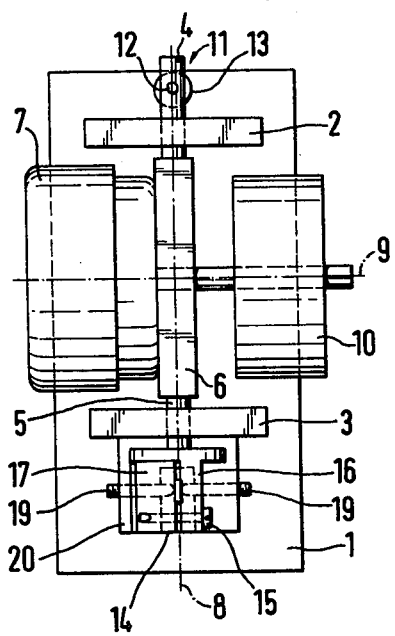

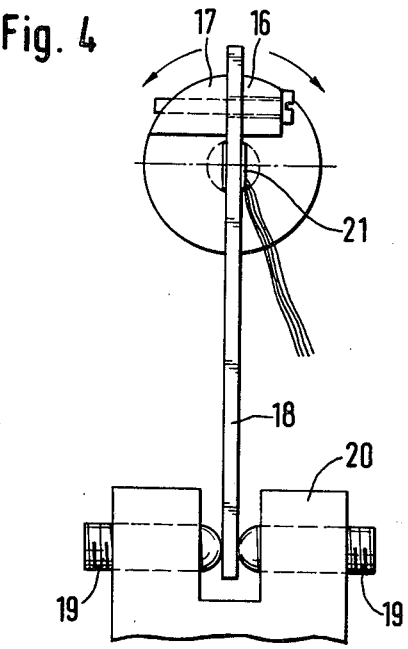
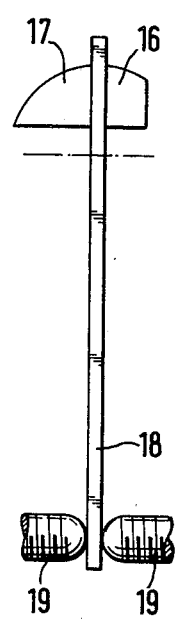
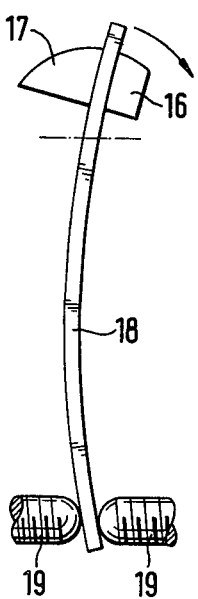
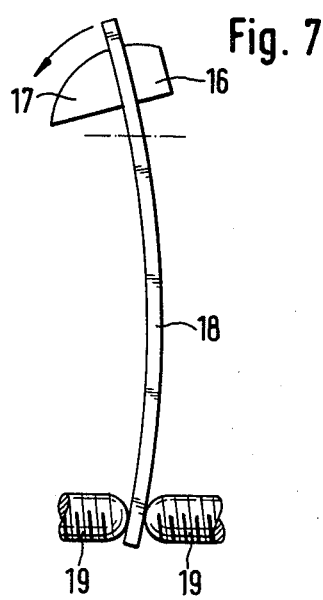

TURN INDICATOR FOR SHIPS OR AIRCRAFT

BACKGROUND OF THE INVENTION

The invention relates to a turning indicator for indicating the turning direction and the turning speed of course changes of a ship or an aircraft.

Such turning indicators have as the basic element the gyroscope of a gyrocompass, which has associated with it an operating device with an indicating unit. Such gyrosystems have, however, the following substantial disadvantages:

A. Because of the high rotary speed of the gyroscope, the lifetime is relatively short.

B. Because of the necessary friction-reconstruction of the gyroscope the same is exceedingly susceptible to impact damage.

C. Because of the high frequency the control of the gyroscope requires very elaborate circuitry.

D. The utilization of the starting signal of the gyroscope requires relatively many circuit components.

E. The damping of the gyroscope is very susceptible to repairs, because only small deflection forces are available. The same is true for the journalling of the gyroscope.

F. Because of the high frequency of the gyroscope system the necessary magnetic protective distance is very large.

G. Because of the low starting signal of the gyroscope the same must be amplified electrically to a great extent, resulting in a very high frequency susceptibility, i.e. in the case of strong high frequency fields, for example radio telephone, the indicator unit will react.

The invention has the task of producing a turning indicator of the type mentioned in the introduction in which the aforementioned disadvantages do not occur and which is of comparatively simple circuitry.

SUMMARY OF THE INVENTION

This task is solved in accordance with the invention that an electromotor is provided which is freely movably journaled by means of a carrier between two supports, then an axle of the carrier is fixedly connected with the upper end of a leaf spring the lower end of which is loosely guided, and that a measuring bridge is mounted on the leaf spring which is connected to an indicating device via an amplifier circuit. The measuring bridge can be supplied with direct current and the starting signal of the same is also in form of direct current which in dependence upon the direction of deflection of the leaf spring is positive or negative and thus constitutes a measure for the direction of turning, whereas the magnitude of the deflection of the leaf spring is a measure for the intensity of the starting signal and thus a measure for the turning speed.

To obtain a friction free damping of the electromotor a further concept of the invention provides for the other axle of the carrier of the electromotor to be connected with an oil damper which consists of a round metal rod which moves in a container filled with silicone oil.

In a further embodiment of the invention the electromotor is constructed as an external-rotor motor, whereby for increasing of the torque a fly wheel is arranged on the axle of the electromotor which extends normal to the axle of the carrier and on that side of the carrier which is opposite to the electromotor.

The koriolis force which results when the electromotor turns and the entire assembly is turned in a horizontal plane to the right or to the left, causes a corresponding tilting of the assembly to the right or to the left, which results in a bending of the leaf spring. Because of the relatively high fly wheel mass the leaf spring is strongly deflected, whereby the starting signal of the measuring bridge becomes so great that it requires only a small amplification for indication in the indicating device. For this, only a few circuit elements are needed. A further advantage of the inventive turning indicator consists in its particularly robust and simple construction. Moreover, friction losses can be practically disregarded since the sole possibility for the occurrence of friction resides in the ball bearings which journal the axles of the carrier of the electromotor in the supports. The friction factor of such ball bearings which are used specifically for navigation devices, is very low. Finally, the turning indicator according to the invention operates in all ranges very linearly and requires only a small magnetic protective spacing of approximately thirty cm.

BRIEF DESCRIPTION OF THE DRAWINGS

The turning indicator according to the invention will hereafter be described in more detail in the following description, based upon an exemplary embodiment which is illustrated in the drawing.

There is shown in:

FIG. 1 a side view of a turning indicator according to an exemplary embodiment of the invention;

FIG. 2 a side view of the turning indicator according to FIG. 1;

FIG. 3 a plan view of the turning indicator according to FIG. 1;

FIG. 4 is a detailed illustration on an enlarged scale of the spring leaf of the turning indicator according to FIG. 1;

FIG. 5 the spring leaf of FIG. 4 in zero position;

FIG. 6 the spring leaf of FIG. 4 in the deflection towards the right;

FIG. 7 the spring leaf of FIG. 4 in the deflection towards the left; and

DESCRIPTION OF THE PREFERRED EMBODIMENTS

Figure 8:
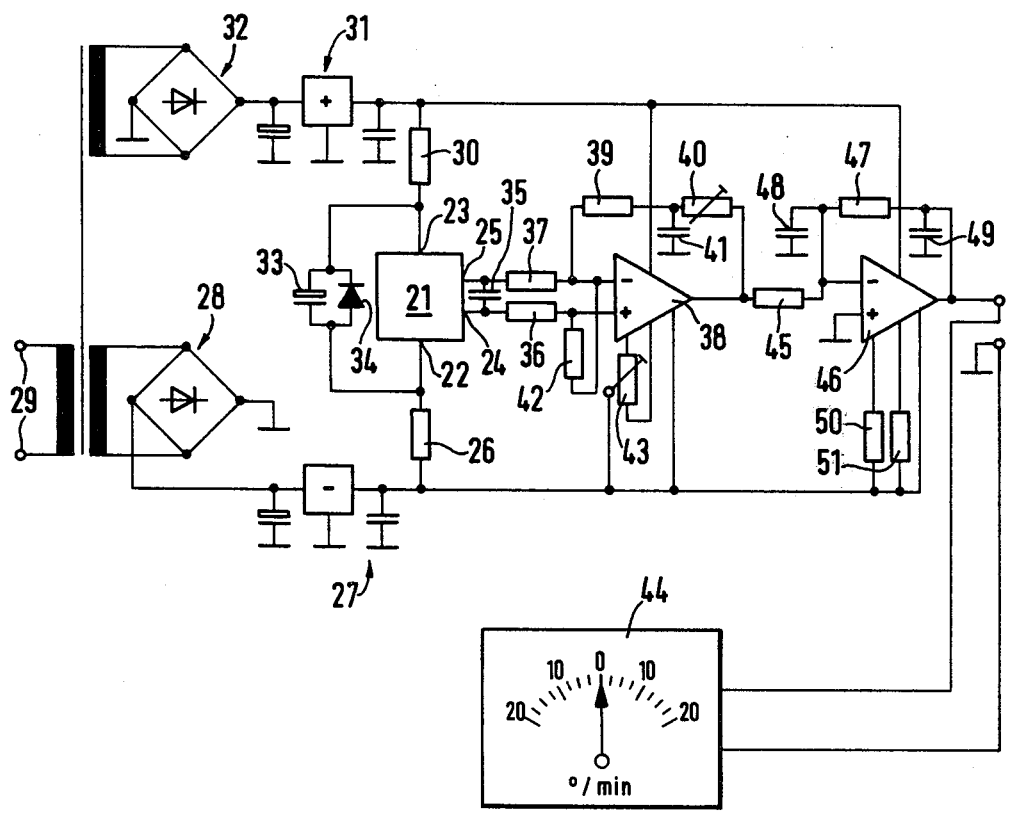
FIG. 8 the circuit diagram of the measuring bridge provided on the leaf spring.

Mounted on the base plate 1 which is to be connected with the ship or the aircraft, at a certain distance from one another, are the plate-shaped supports 2, 3. Mounted in the support 2 via a not illustrated ball bearing is the axle 4, and mounted in the support 3 via a not illustrated ball bearing is the axle 5 of the carrier 6 for an electromotor 7. The axle 9 of the electromotor 7 which extends at a right angle to the axle 8 of the carrier 6, carries on the side of the carrier 6 opposite the electromotor 7 a fly wheel 10 which serves to increase the torque of the electromotor 7 that is constructed as an external-rotor motor.

The free end of the axle 4 which extends beyond the outer side of the support 2 is connected with an oil damper 11. This oil damper 11 consists of a round metal rod 12 secured on the axle 4 and extending with its free end into a container 13 that is filled with silicone oil. The container 13 rests on the base plate 1. The axle 5 of the carrier 6 which is journaled in the support 3 merges at its end projecting beyond the outer side of the support 3 into an upwardly directed angle piece 14 which is composed of two clamping jaws 16, 17 that can be pressed together by a screw 15. A leaf spring 18 is firmly clamped between these two clamping jaws 16, 17 and its lower end is guided with freedom of sliding movement between two juxtaposed adjusting screws 19. The adjusting screws 19 are arranged in a U-shaped mount 20 secured to the support 3 and are arcuately shaped at their ends facing the leaf spring. In this manner the lower end of the leaf spring 18 can move without difficulty between the adjusting screws 19 in correspondence with a deflection of the leaf spring to the right or to the left. Mounted on the leaf spring 18 at the level of the axle 9 of the electromotor 7, and thus also at the level of the axles 4, 5 of the carrier 6, is a measuring bridge 21 which on occurrence of the koriolis force measures on the one hand the direction of the deflection of the leaf spring and on the other hand the intensity of the deflection.

The measuring bridge 21 has four connecting points 22, 23, 24 and 25. The connecting point 22 is connected to the current supply of a ship via a resistor 26, a negative voltage regulator 27 and a voltage converter 28, whereas the connecting point 23 of the measuring bridge 21 is connected via a resistor 30, a positive voltage regulator 31 and a voltage converter 32 to the electrical supply 29. Parallel to the measuring bridge 21 and in parallel circuit connection are a capacitor 33 and a diode 34 which serve to reduce the influence of possible control signals from the supply lines. The signal from the measuring bridge 21 is supplied via the connecting points 24, 25, the capacitor 35 serving as an interference eliminator, and the resistors 36, 37 to the amplifier 38. The amplification of this first amplifier stage depends upon the resistors 37, 39 and 40, with the amplification being variable by means of the adjustable resistor 40. The capacitor 41 increases the amplification at high frequencies. In parallel to the capacitor 35 a further resistor 42 is provided immediately ahead of the input of the amplifier 38. The further adjustable resistor 43 associated with the amplifier 38 serves for zero setting of the indicator device 44. The starting signal of the first amplifier stage is supplied via the resistor 45 to the second direct current amplifier 46. The amplification of the direct current here based upon the ratio of the size of the resistor 47 to the size of the resistor 45. The capacitors 48, 49 serve to block higher frequencies. The offset regulation from the second stage is determined by the resistors 50, 51. The signal from the measuring bridge 21 is sufficiently strong at the output of the second amplifier 46 to control the indication of the indicating device 44.

What is claimed is:

1. Turn indicator for indicating the turning direction and the turning speed of a change in course of a ship or aircraft, comprising motor means; carrier means; said motor means being freely movably mounted between supports by said carrier means; said carrier means having an axle; leaf spring means having an upper end fixedly connected to said axle; said spring means having a loosely guided lower end; measuring bridge means on said spring means; and indicating means connected to said bridge means through amplifier means.

2. Turn indicator as defined in claim 1, wherein said measuring bridge is operable with direct current; a source of direct current for applying a starting signal to said bridge means and being positive or negative in dependence upon the direction of deflection of said spring means for indicating the turning direction, said leaf spring means having a magnitude of deflection which is a measure for the intensity of said starting signal and thereby a measure for the turning speed.

3. A turn indicator as defined in claim 1, wherein said carrier means has a further axle for said motor means, said further axle having an oil damper comprising a rounded metal rod moving in a container filled with silicone oil.

4. A turn indicator as defined in claim 1, wherein said motor means comprises an external-rotor motor.

5. A turn indicator as defined in claim 1, including a fly wheel mounted on an axle of said motor means, the axle of said motor means extending normal to an axle of said carrier means on a side of said carrier means located opposite to said motor means.

6. A turn indicator as defined in claim 1, including two clamping jaws operable by screw means, said leaf spring means being fixedly clamped at said axle of said carrier means between said clamping jaws.

7. A turn indicator as defined in claim 1, including two oppositely located adjusting screws, said leaf spring means having a lower end slidably movable between said adjusting screws, said adjusting screws having ends facing said leaf spring means and being arcuately shaped and having U-shaped mount means connected to an associated support.

8. A turn indicator as defined in claim 1, including a first connection point, resistor means, a negative potential regulator and a voltage convertor for connecting said bridge means to an electrical circuit of a ship or aircraft, on the one hand; and a second connecting point, second resistor means, a positive voltage regulator and second voltage converter for connecting said bridge means to said electrical circuit on the other hand.

9. A turn indicator as defined in claim 1, wherein said amplifier means comprises a first amplifier stage and a second amplifier stage, said bridge means being connected to said indicating means through two connecting points.

10. A turn indicator as defined in claim 9, wherein said first amplifier stage has an adjustable resistor for setting a zero point of said indicating means, said first amplifier stage having auxiliary adjustable resistor means for setting the magnitude of amplification.

* * * * *